(12) United States Patent
Gruschow et al.

(10) Patent No.: US 10,703,199 B2
(45) Date of Patent: *Jul. 7, 2020

(54) FLOATING DIFFERENTIAL SUSPENSION SYSTEM

(71) Applicant: Amanda Bent-Bolt Company, Logan, OH (US)

(72) Inventors: Robert Gruschow, Northville, MI (US); Wesley Scott Holmes, Mesa, AZ (US); Nicholas Paul Stephey, Holgate, OH (US)

(73) Assignee: Amanda Bent-Bolt Company, Logan, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/434,325

(22) Filed: Jun. 7, 2019

(65) Prior Publication Data

US 2019/0283575 A1 Sep. 19, 2019

Related U.S. Application Data

(63) Continuation of application No. 15/769,473, filed as application No. PCT/US2016/060076 on Nov. 2, 2016, now Pat. No. 10,358,029.

(Continued)

(51) Int. Cl.
*B60K 17/16* (2006.01)
*B60G 3/04* (2006.01)
*B60K 17/04* (2006.01)

(52) U.S. Cl.
CPC .............. *B60K 17/165* (2013.01); *B60G 3/04* (2013.01); *B60K 17/043* (2013.01)

(58) Field of Classification Search
CPC ....... B60K 17/165; B60K 17/043; B60G 3/04
See application file for complete search history.

(56) References Cited

U.S. PATENT DOCUMENTS

| 4,081,049 A | 3/1978 | Youmans |
| 4,354,567 A | 10/1982 | Puchas |

(Continued)

FOREIGN PATENT DOCUMENTS

| EP | 1348587 A2 | 10/2003 |
| EP | 1510365 A1 | 3/2005 |

OTHER PUBLICATIONS

International Search Report and Written Opinion for International Patent Application PCT/US2016/060076 dated Feb. 7, 2017, 12 pages.

*Primary Examiner* — James A English
(74) *Attorney, Agent, or Firm* — Hahn Loeser & Parks LLP

(57) ABSTRACT

The present invention provides a vehicle differential linked to and is arranged to move with a control arm and/or an a-arm of a suspension assembly, providing a floating differential suspension system. The differential is adapted to be mounted independent of the vehicle frame. Advantages of a floating differential suspension system include better alignment between the differential and the transfer case, reduced drive shaft movement in the vertical direction, minimal plunge at the drive shaft splines, longer axle length with increased wheel travel, decreased angle at mechanical connections, reduced camber change through the wheel travel, lower frame construction with increased range of suspension travel, and reduced risk of vehicle roll over without compromising the range of suspension travel.

20 Claims, 8 Drawing Sheets

Related U.S. Application Data

(60) Provisional application No. 62/249,408, filed on Nov. 2, 2015.

(56) References Cited

U.S. PATENT DOCUMENTS

| | | |
|---|---|---|
| 4,422,666 A | 12/1983 | Proctor |
| 4,596,299 A | 6/1986 | Krude |
| 4,600,072 A | 7/1986 | Krude |
| 4,652,009 A | 3/1987 | Ando et al. |
| 4,669,571 A | 6/1987 | Kurde |
| 4,705,128 A | 11/1987 | Krude |
| 5,402,859 A | 4/1995 | Boberg et al. |
| 5,725,453 A | 3/1998 | Zalewski et al. |
| 5,950,750 A | 9/1999 | Dong et al. |
| 6,105,984 A | 8/2000 | Schmitz et al. |
| 6,357,769 B1 | 3/2002 | Omundson et al. |
| 7,559,403 B2 * | 7/2009 | Schmitz .................. B60G 3/20 180/344 |
| 7,874,398 B2 | 1/2011 | Mikels et al. |
| 8,342,548 B1 | 1/2013 | Vey et al. |
| 8,387,740 B2 | 3/2013 | Melcher |
| 8,480,106 B1 | 7/2013 | Cohen |
| 8,585,068 B2 | 11/2013 | Schlangen et al. |
| 2013/0127146 A1 | 5/2013 | Ohno et al. |

* cited by examiner

FLOATING DIFFERENTIAL SUSPENSION SYSTEM

This application is a continuation application of U.S. patent application Ser. No. 15/769,473 filed Apr. 19, 2018 with the United States Patent Office which is a national stage filing of International Patent Application No. PCT/US2016/060076 filed Nov. 2, 2016 which further claims priority to, and the benefit of, U.S. Provisional Application No. 62/249,408 filed on Nov. 2, 2015 with the United States Patent Office, each of which are hereby incorporated by reference in their entirety.

BACKGROUND

The present invention relates to differentials for transferring rotational torque from a drive system to a wheel assembly. The rotational torque is transferred from a drive system through the differential to one or more axles and/or one or more wheel assemblies. Differentials are generally secured to a vehicle frame or a component of the vehicle frame. When the differential is secured to the vehicle frame the vertical range of movement of the wheel assembly is limited by the position of the differential at the vehicle frame. A new differential system is needed to increase the vertical range of movement of the wheel assembly while limiting the modifications to the existing components or existing design of a motor vehicle. An increased range of vertical wheel travel is particularly advantageous in off-road vehicle applications.

The present invention is an improvement to a conventional differential system which is rigidly mounted to a vehicle frame, such as with a traditional independent front suspension (IFS) system, by linking a differential to a suspension system of a motor vehicle. Additionally, the present invention is an improvement to a differential system used in combination with a twin-traction beam (TTB) independent front suspension system, which extends a beam for securing a differential across a center of a vehicle's width. An improved differential system is presented for reducing mechanical stresses at the drive system, reducing camber at the wheels, and reducing the risk of vehicle roll-over while increasing the vertical wheel travel.

SUMMARY

This invention relates in general to vehicle suspension systems and vehicle drivetrains. More particularly, this invention relates to securing a vehicle differential to a vehicle suspension system.

The present invention provides advantages over the prior art and, particularly, over the two systems identified above. Advantages include better alignment between the differential and the transfer case by extending and offsetting the driveshaft to one side of the center of a vehicle width. This further reduces the drive shaft movement in the vertical direction and reduces the drive shaft plunge at the drive shaft splines. Another advantage includes increasing the length of the axle traversing the center of the vehicle width while also increasing the vertical wheel travel, thereby, decreasing the angle at which mechanical connections are made and reducing the stresses at those mechanical connections. Moreover, since each suspension system is maintained to one side or the other of the center of the vehicle width the camber exhibited over the distance of wheel travel is reduced. This is in contrast to a suspension system which extends across the center of the vehicle width. Further, in the present invention, the vehicle and its frame may be provided at a lower elevation, thereby, reducing the risk of vehicle roll-over without comprising the range of suspension travel.

In the present invention, a vehicle having a floating differential suspension system links a differential to a vehicle's lower control arm and/or upper a-arm on a vehicle's suspension system. As used herein, floating means moving with or relative to the vehicle's suspension system. In other words, a floating differential is not secured to or mounted to a vehicle frame and, thereby, is independent of the vehicle frame. A differential mounted independent of a vehicle frame may be mounted to other components of a vehicle assembly, including a suspension system, an axle assembly, a cradle assembly, a wheel assembly and/or the like. In particular embodiments, the differential is mounted to a suspension system and correspondingly moves relative the lower control arm and/or upper a-arm of the suspension system. To secure the differential to the control arm and/or a-arm, the differential is positioned offset from the vehicle centerline or, in other words, to one side or the other of the vehicle centerline in the widthwise direction. The vehicle centerline dividing the width of the vehicle. More particularly the vehicle centerline divides the vehicle width into two generally equal portions. Specifically, the differential is secured to and moves with a lower control arm and/or upper a-arm that is isolated to one side or the other of the vehicle center in the widthwise direction.

Embodiments include a drive system for a motor vehicle comprising a transfer case adapted to transfer rotational torque from a power plant. A differential is linked to and is arranged to move with a control arm and having a corresponding range of motion, where the differential is adapted to be mounted independent of a vehicle frame. In embodiments, the control arm, a-arm and/or the differential are located to one side of a vehicle centerline of a width of the motor vehicle. The differential may be linked to the control arm and/or a-arm by a shackle system. The shackle system may include one or more shackles.

In some embodiments, a cradle assembly may also be connected to the differential. The differential may be connected to both the cradle assembly and a control arm. Alternatively, the cradle assembly may be the mechanism connecting the differential to the control arm and allow the differential to move with the control arm having a corresponding range of motion. The cradle assembly may be secured to the vehicle frame. It is appreciated, however, the cradle assembly allows the differential to move with the control arm having a corresponding range of motion. In various embodiments, the cradle assembly may further connect multiple suspension systems together as a suspension unit. By example, the cradle assembly may connect a first suspension system and second suspension system, as further described below, into a suspension unit. The suspension unit may be constructed independent of the vehicle frame. The suspension unit may be secured to the vehicle frame where the suspension unit maintains independent movement at each suspension system. This independent movement includes the movement of the differential which moves with the control arm and/or a-arm having a corresponding range of motion.

The differential is arranged to engage and transfer rotational torque from the transfer case to a wheel assembly. The drive system may have an axle connected to the differential and the wheel assembly and is arranged to move with the control arm and the differential. In addition, the axle may be connected to the differential by a universal joint. A drive shaft is also provided to connect the transfer case to the differential. Drive shaft splines may be used to connect the drive shaft to the differential.

In some embodiments, one or more drive shaft splines are used to connect the drive shaft to the transfer case and one or more draft shaft splines are used to connect the drive shaft to the differential. In various embodiments, the drive shaft plunge at the one or more drive shaft splines is between 0.0 and 1.0 inch.

In some embodiments, a drive system from a motor vehicle comprises a first suspension system at a first wheel assembly and a second suspension system at a second wheel assembly. A differential is adjacent to and/or connected to the first suspension system wherein the differential is linked to and moves with the first suspension system, such as through a control arm and/or an a-arm of the first suspension system with a corresponding range of motion. The differential is adapted to be mounted independent of the vehicle frame. The differential transfers rotational torque from a transfer case to the first wheel assembly and to the second wheel assembly. In some embodiments, a vehicle centerline, of the width of the vehicle, separates the first suspension system from the second suspension system.

In particular embodiments, the first and second suspension system has up to 16 inches of vertical travel at the wheel assembly. In these embodiments, a drive shaft may connect the differential to a power plant or transfer case and the drive shaft plunge is no more than 0.500 inch for every 5 feet to 7 feet of length of the longitudinal axis of the drive shaft. Some embodiments may limit the angle between the longitudinal axis of the drive shaft and a horizontal plane of the differential to 31 degrees or less. In other embodiments, the angle between the longitudinal axis of the drive shaft and a horizontal plane of the differential is from 32 degrees to 45 degrees.

In one embodiment, the drive shaft may connect the differential to the power plant or transfer case proportionate with the following parameters. A vertical travel of the first suspension system and the second suspension system is 16 inches. A drive shaft length at full compression of the first suspension system and the second suspension system is 41.05 inches. A drive shaft length at full droop of the first suspension system and the second suspension system is 41.62 inches. An overall drive shaft plunge is 0.570 inches. Various other embodiments carrying similar proportions are contemplated.

Embodiments of the present invention may also include a drive system for a motor vehicle comprising a differential connected to a wheel assembly by an axle. The wheel assembly may be connected to a vehicle frame by a suspension system. The differential may be linked to and moves with the suspension system where the differential is mounted independent of the vehicle frame. The axle plunge of the axle at the differential, may be limited to 0.695 inches or less. Similarly, the axle plunge of the axle at the suspension system may be limited to 0.750 inches or less.

A method for mounting a drive system to a motor vehicle is also included in the present invention. The method includes providing a transfer case for transferring rotational torque from a power plant. Connecting the transfer case to a differential mounted independent of the vehicle frame. Transferring rotational torque to a wheel assembly through the differential. Linking the differential to a suspension system at the wheel assembly where the differential moves relative the suspension system and the suspension system is positioned to one side of a vehicle centerline of the width of the motor vehicle.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
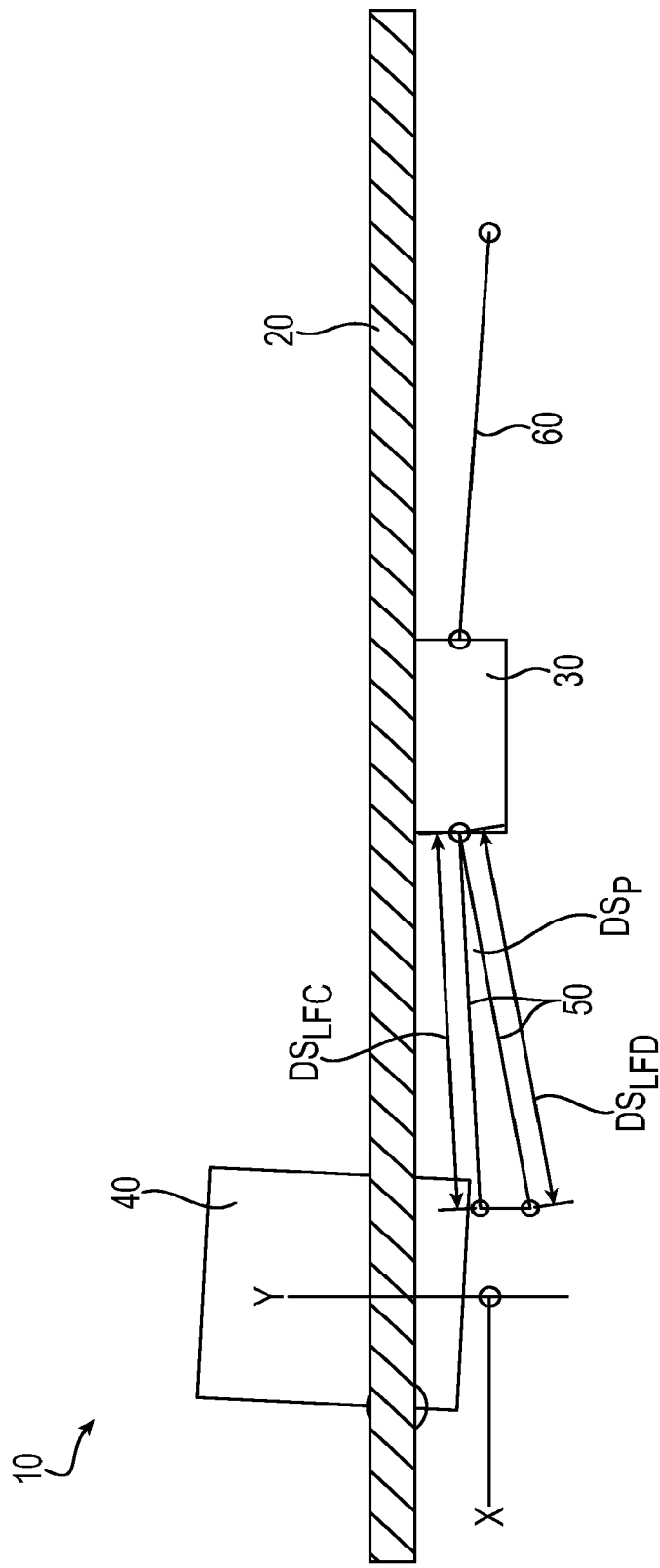
FIG. 1 is a cross sectional view of vehicle drivetrain extending a portion of the length of a vehicle, in accordance with an embodiment of the invention.

In some embodiments, the vehicle comprises a first suspension system at a first wheel assembly and a second suspension system at a second wheel assembly. In various embodiments, the first suspension system is positioned to one side of the vehicle centerline and the second suspension system is positioned opposite the first suspension system on the other side of the vehicle centerline, the vehicle centerline positioned relative the vehicle width. In other words, at least a portion of the vehicle width separates the first suspension system from the second suspension system. In various embodiments, the first suspension system includes a lower control arm and an upper a-arm. The first suspension system may be secured to a vehicle frame but is not a component of the vehicle frame. In yet other embodiments, the first suspension system may comprise a single control arm or a-arm, a plurality of control arms and/or a-arms, or any combination thereof. The lower control arm and/or the upper a-arm are connected to a spindle. Generally, the spindle is positioned between the lower control arm and the upper a-arm. Extending from the spindle is a wheel assembly further comprising a hub and a bearing assembly. In the present invention, the wheel assembly is characterized as any wheel assembly known by one skilled in the art and may include or exclude any of the components listed above. Further, the suspension system as described above may include any suspension system comprising at least one control arm and/or a-arm as known to those skilled in the art.

The movement of a vehicle is generated through a drive system. A drive system includes a power plant. The drive system is connected to the differential and transfers rotational torque from the drive system to one or more vehicle axles and one or more wheel assemblies. The drive system may be connected directly to the differential. Alternatively, the rotational torque from the drive system may be transferred through a drive shaft and/or a transfer case. By example, in some embodiments, a transfer case is adapted to transfer rotational torque from a power plant. Examples of a power plant include an internal combustion engine, an electric motor, a turbine, etc. The transfer case transfers the rotational torque from the power plant to the one or more vehicle axles. In various embodiments, a drive shaft connects the transfer case to a differential. The rotational torque is transferred by the rotation of the drive shaft rotating about an axis extending the length of the drive shaft. The transfer case rotates the drive shaft extending to a differential and to the one or more vehicle axles extending from the differential. However, as indicated above, it is appreciated the rotational torque may be transferred directly to the differential from the engine or a transmission.

A differential is connected to the vehicle axle to further transfer the rotational torque from the drive system to the vehicle axle extending to one or more wheel assemblies. In other words and with reference to the embodiment comprising a transfer case, the differential is arranged to engage and transfer rotational torque from the transfer case to the one or more wheel assemblies. In an embodiment, the differential is located opposite the transfer case at opposing ends of the length of the drive shaft. In embodiments where a transfer case is not used, the differential is directly connected to the drive system or is located opposite the drive system on the length of the drive shaft. In yet other embodiments, multiple drive shafts may extend from the transfer case in vehicles having multiple drive axles. By example, in a four wheel drive vehicle, a front drive system with a drive shaft may extend to the differential positioned on the front axle and a rear drive system with a drive shaft may extend to the differential positioned on the rear axle.

Extending from the differential are one or more vehicle axles for transferring rotational torque to the one or more wheel assemblies. The axle is connected to or passes through the spindle thereby providing rotational torque at a hub. At the one or more wheel assemblies, the rotational torque rotates the one or more wheel assemblies and rotates one or more tires in contact with a driving surface, such as a road surface. The rotation of the tire and the friction between the tire and driving surface propels the vehicle across the driving surface.

The drive system is connected to the differential by one or more mechanical connections. In embodiments comprising a drive shaft, the drive shaft is connected to the differential, the transfer case, the transmission, and/or the power plant using one or more drive shaft splines. The drive shaft splines are an example of a mechanical connection providing freedom in the longitudinal movement along the length of the drive shaft while transferring the rotational torque to or from the differential, the transfer case, the transmission and/or the power plant. A drive shaft spline includes any connection means providing freedom in longitudinal movement while transferring the rotational movement through the drive shaft. Examples of such a connection includes inserting the drive shaft into a slot, aperture, or connection at the draft shaft spline. In an embodiment, a slot is arranged to provide movement in the axial direction or longitudinal direction of the drive shaft while securing the drive shaft for rotation about the longitudinal axis of the drive shaft. The total amount of movement in the axial direction is referred to as plunge and may also be referred to as yoke travel at each respective longitudinal end of the drive shaft. To secure the drive shaft for rotation about the longitudinal axis, the drive shaft may comprise keys, teeth, and/or gears inserted into a slot at the drive shaft spline, or vice versa. A drive shaft spline may be used at one or both longitudinal ends of the drive shaft. Other mechanical connections or a combination of mechanical connections may be used in alternative or in addition to securing the drive system directly to the differential or through the drive shaft connected to the differential, the transfer case, the transmission, and/or the power plant. Examples of other mechanical connections include a CVD (constant velocity) joint or a universal joint.

The axle is pivotally connected to the differential and the wheel assembly and is arranged to move with the control arm, a-arm, and/or the differential. The one or more axles are connected to the differential and/or the one or more wheel assemblies using one or more mechanical connections. Similar to the drive shaft, the axle is rotated about its longitudinal axis along the length of the axle to transfer the rotational torque from the differential to each respective wheel assembly. The one or more axles are connected to the differential at a first longitudinal end of the axle and connected to a wheel assembly at the opposing second longitudinal end of the axle. The various mechanical connections used at each of these connections are arranged to transfer the rotational torque while maintaining pivotal, rotational, angular, and/or longitudinal freedom of movement. This freedom of movement allows the axle to move with a control arm, a-arm and/or the differential in a variety of directions. A combination or variety of mechanical connections may be used at either longitudinal end or both longitudinal ends of the axle. In some embodiments, the axle is connected to the differential by a CV joint. Further, the axle may comprise an intermediate mechanical connection, referred to as a knuckle, dividing the axle into a first half axle and a second half axle through which the rotational torque transfers. Again, this intermediate connection may comprise any mechanical connection known in the art.

In some embodiments, a differential is connected to a first axle and a second axle. The differential is arranged to engage and transfer rotational torque from the transfer case to a first wheel assembly by way of the first axle. Similarly the differential is arranged to engage and transfer rotational torque from the transfer case to a second wheel assembly by way of the second axle. In some embodiments, one or more differentials may be provided to provide rotational torque at additional axles and wheel assemblies.

In some embodiments, the differential is linked to and is arranged to move with a control arm and/or a-arm. Further, the differential is linked to the control arm and/or a-arm having a corresponding range of motion as the control arm and/or a-arm. In embodiments of the invention, the first suspension system includes a lower control arm and/or an upper a-arm. For example, the differential may be connected to the lower control arm by means of a shackle system. The shackle system may keep the differential in-line with the axle, drive shaft, wheel assembly, suspension system, and/or knuckle. In these embodiments the control arm and/or a-arm may be positioned above or below the differential, thereby, the differential and the control arm and/or a-arm may have different pivot points. The shackle system allows the differential to move in relationship with the control arm while maintaining the different pivot points. In alternative embodiments, the differential and the control arm may be constructed to share a pivot point on the vehicle. In order to achieve a shared pivot point, the strength of the shear bolt connecting the suspension system to the vehicle frame may need to be increased in order to offset the resulting increased stresses at the pivot point. In these embodiments wherein the differential shares a pivot point with the control arm and/or a-arm, the differential may be rigidly attached to the control arm and/or a-arm.

In some embodiments, the shackle system includes a first shackle connected to the differential and a second shackle connected to the lower control arm where the first shackle and the second shackle are additionally connected. The shackle system allows the top of the differential to pivot between the lower control arm and the upper a-arm. The shackle system secures the differential to the lower control arm while maintaining a degree of freedom vertically, laterally and/or rotatably between the differential and the lower control arm. In this way, the differential moves in relation to the lower control arm or in general unison with the lower control arm. One or more shackle systems may be used to secure the differential to the lower control arm. In yet other embodiments, the differential may additionally or alternatively be connected to the upper a-arm using one or more shackle systems. This may be in combination with, or independent of, the lower control arm with a similar structure as described with respect to the lower control arm.

In some embodiments, the shackle system may include means for adjusting the distance between or the position of the differential in relation to the control arm and/or the a-arm. Examples of this means for adjustment may include threaded rods, adjustable slots and pins, a ratchet connection or any other adjustable mechanical connection known in the art. The means for adjustment may be provided between the first shackle and the second shackle. Further, the shackle system may be arranged to rotate or pivot at the differential, the control arm and/or a-arm, between the differential and the control arm and/or a-arm, and/or at each location. Further, more than one shackle systems may be used.

In embodiments, the differential is adapted to move independent of the vehicle frame. As indicated above, the differential is linked to and is arranged to move with the suspension system, via the control arm and/or a-arm, by example. This insures the differential is separate and independent of the vehicle frame. By linking and moving the differential with the control arm and/or a-arm, the movement of the differential corresponds with the vertical movement of the wheel assembly and/or the suspension system. By providing corresponding movement between the differential and the vertical movement of the wheel assembly and/or the suspension system, the angle at which the longitudinal axis of the axle intersects the differential, the wheel assembly, and/or the suspension system is decreased over the range of vertical travel of the suspension system and/or wheel assembly. Thereby, these components are moving in unison or in relation to one another and are forming a system of moving components, as illustrated and described in FIG. 8, below. Vertical suspension travel, vertical wheel travel, vertical movement of the wheel assembly, and/or vertical movement of the suspension system are used synonymously herein. The fullest extent of the vertical suspension travel and/or vertical wheel travel is the greatest amount of vertical travel available at the outer most extend of the wheel assembly, from full compression of the suspension system to full droop of the suspension system. Full compression is when the suspension system is compressed to its fullest extent. Full droop is when the suspension system is extended to its fullest extent.

As mentioned above, it is appreciated that the differential linked to the control arm and/or a-arm may move at a different range of motion than the control arm and/or a-arm. In particular, the differential may have a first range of motion and the control arm and/or a-arm may have a second range of motion. The second range of motion may be independent of the first range of motion. In particular, the control arm and/or a-arm is attached to the vehicle structure at a different pivot point than the axle and/or drive shaft connections at the differential. Therefore, each of these components move at different rates and at different positions. The shackle system may link the differential to the control arm and/or a-arm and provide movement between the control arm and/or a-arm and the differential at these different rates.

Figure 3:
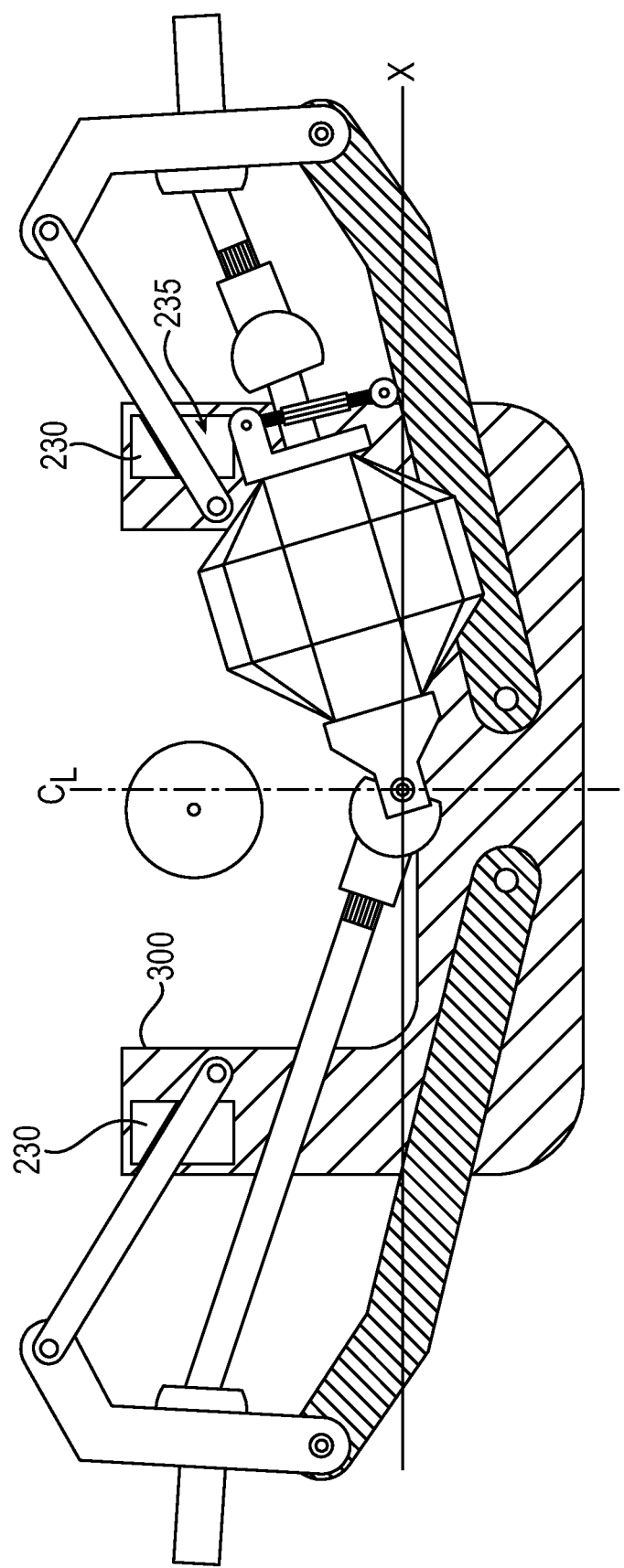
FIG. 3 is a cross sectional view of the floating differential suspension system at full compression and extending a portion of the width of the vehicle, in accordance with an embodiment of the invention.
Figure 4:
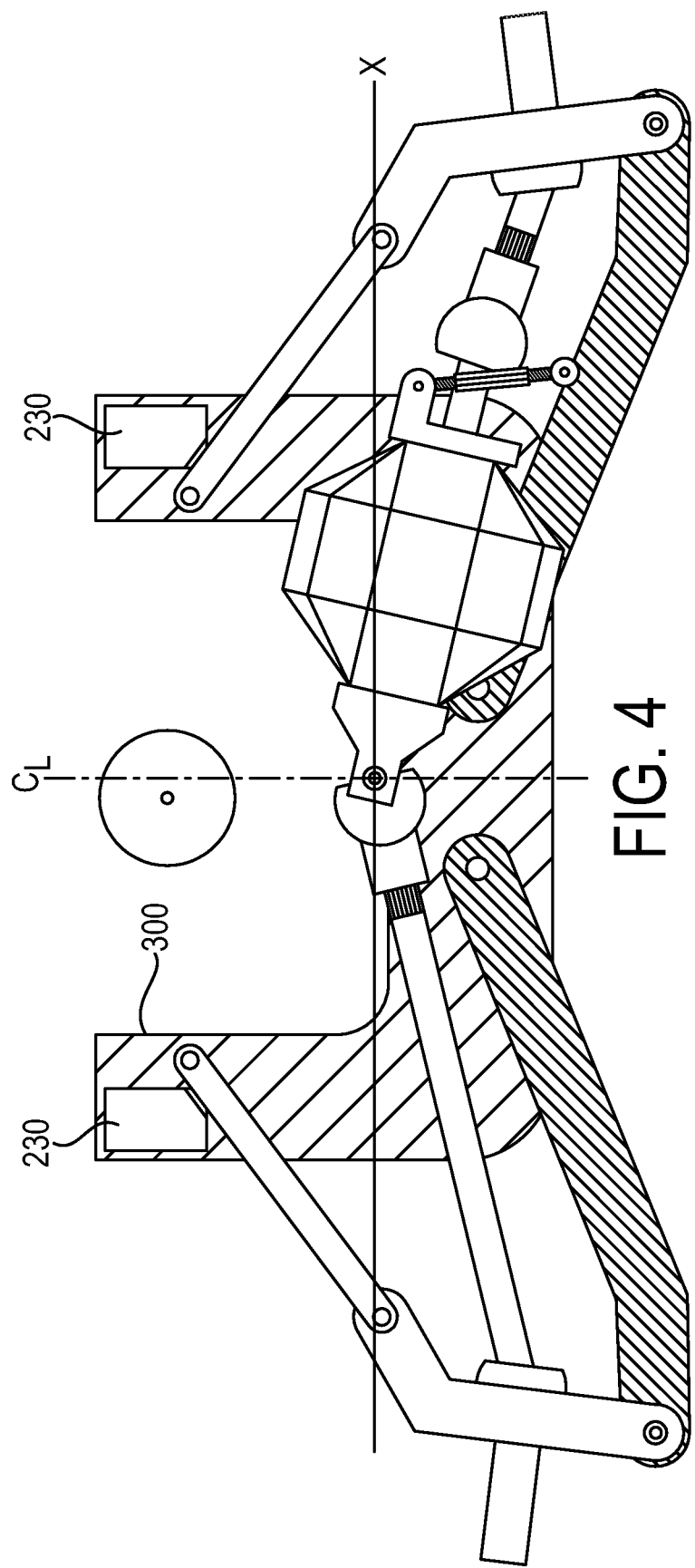
FIG. 4 is a cross sectional view of the floating differential suspension system at full droop and extending a portion of the width of the vehicle, in accordance with an embodiment of the invention.

In some embodiments, the differential may be connected to a cradle assembly. As illustrated in FIGS. 3-4, a cradle assembly 300 is a structure for securing moveable components, such as a suspension system, axle assembly, or the like to one another, to a frame component and/or to the frame of a vehicle 230. The differential may also be moveably connected to the cradle assembly 300. Through the cradle assembly 300, the differential moves with the control arm and/or a-arm having a corresponding range of motion. In yet another embodiment, the differential may connect to both the cradle assembly and the suspension system. In such an embodiment, the differential may be linked to the control arm and/or a-arm by a shackle system at a first end and linked to the cradle assembly at a second end. In some embodiments, the first end of the differential, linked to the control arm and/or a-arm, moves with the control arm having a corresponding range of motion and the second end of the differential, linked to the cradle assembly, moves with and/or pivots at or near the cradle assembly. In these embodiments, although the differential moves with a corresponding range of motion of the control arm it additionally moves with a corresponding range of motion of the cradle assembly, thereby moving between the control arm and the cradle assembly. It is also appreciated that the control arm may additionally be connected to the cradle assembly.

A cradle assembly may connect multiple suspension systems together to form a suspension unit. In an embodiment, a first suspension system and a second suspension system are connected to the cradle assembly. A differential may be connected to the first suspension system, as described above. The differential may also be connected to the cradle assembly. The cradle assembly, the multiple suspension systems, and the differential may be constructed independent of a vehicle frame component or vehicle frame. Once fully constructed, the cradle assembly may be secured to the vehicle frame, thereby, maintaining independent movement of the differential and suspension systems, relative the vehicle frame. In some embodiments, the differential is linked to and connected to a first wheel assembly. By moving the differential in a corresponding relationship with the first wheel assembly, the movement or the angle at which the longitudinal axis of the axle intersects the differential and the wheel assembly is decreased over the distance of vertical travel at the suspension system or wheel assembly. This reduced angle decreases the drive shaft plunge and thereby reduces the axial loads on the drive shaft and stresses at the connections. As known by one of ordinary skill in the art, drive shaft plunge includes the distance a drive shaft extends or retracts to or from the joints at each axial end as a result of the angle of the drive shaft and movement of the drive shaft. In contrast, a prior art differential, which is affixed to the vehicle frame, remains fixed independent of the suspension system and/or wheel assembly. In the prior art, as a suspension and/or wheel assembly moves vertically in this configuration, the differential does not move in a corresponding manner. Thereby, the angle, at which the longitudinal axis of the axle intersects each adjoining component, increases over the range of vertical travel of the suspension system or wheel assembly and, thereby, the amount of drive shaft plunge is greater.

Additional advantages of reducing the angle at which the longitudinal axis of the axle intersects the differential and/or the one or more wheel assemblies includes reduced camber. Excess camber is the primary cause for an increased change in the scrub radius and creates bump steer. An increased change in the scrub radius and bump steer require an increase in rotational torque at the wheel when turning a vehicle. An increase in camber increases tire wear. By maintaining the scrub radius and controlling bump steer, less energy is exerted by the power plant for a vehicle to turn and the life of the tire is improved.

Some embodiments of the floating differential suspension system allow a vehicle to reduce the elevation of the vehicle frame or maintain a vehicle's stock elevation, while increasing the range of vertical travel of the wheel assembly and/or suspension system. This allows a mechanic to make modifications to an existing vehicle while limiting expense, modification, and/or replacement of other components of a vehicle. This is particularly advantageous for mechanics who are making modifications to a vehicle for off-road use, which may not otherwise be suitable for the intended off-road application. Also, by maintaining or reducing the vehicle frame elevation and the roll center of the vehicle, vehicle balance is maintained or improved and the risk of vehicle roll-over is reduced while increasing the range of suspension travel or without compromising the range of suspension travel. This provides a more stable vehicle at higher speeds. Simply, the higher the roll center of the vehicle, the more the vehicle wants to roll-over in a curve. By example, in the prior art suspension systems, in order to increase the range of vertical travel of the wheel assembly and/or suspension system, the height of the vehicle frame must be increased to accommodate the additional vertical travel. The embodiments of the floating differential suspension system maintain vehicle stability while increasing the range of vertical travel at the wheel assembly and/or suspension system.

The ability to reduce or maintain a stock vehicle frame elevation under the present invention also reduces the amount of drive shaft plunge. In embodiments of the present invention, the plunge at the drive shaft is limited to 0.500 inch over 5 feet to 7 feet of drive shaft length with 16 inches of vertical suspension travel or vertical wheel travel. This is achieved without modifying a vehicle's stock components, such as widening the control arms and/or bringing the control arms across the centerline of the width of the vehicle. However, additional modifications may be made in combination with the floating differential suspension system to increase the vertical suspension travel or vertical wheel travel and increase the vehicle frame elevation to amplify the amount of vertical wheel travel. In some embodiments of the present invention, wherein 16 inches of vertical travel at the suspension system is achieved, the angle at which the longitudinal axis of the drive shaft intersects the differential is limited to 31 degrees with a stock vehicle frame elevation (although, in these embodiments, this angle may be adjusted up to 45 degrees to achieve more vertical travel at the suspension system based upon the vehicle frame elevation and/or the position of and adjustment to the upper vehicle frame rail). Additional adjustments may be made to limit or increase the performance of the floating differential suspension system and the distance of vertical travel at the suspension system. By example, the control arm and/or a-arm may be modified to extend through a void of the vehicle frame rail and/or by modifying or providing a control arm and/or an a-arm to allow at least a portion of the control arm and/or a-arm to extend past a horizontal plane of the frame rail. This would extend the upper limits of vertical travel of the suspension system and/or the wheel assembly that occurs when a suspension system contacts the frame rail. Additionally, and alternatively, the vehicle frame may be modified and/or raised.

The embodiments of the floating differential suspension system discussed above will now be described in further detail below in association with the accompanying Figures.

Figure 5:
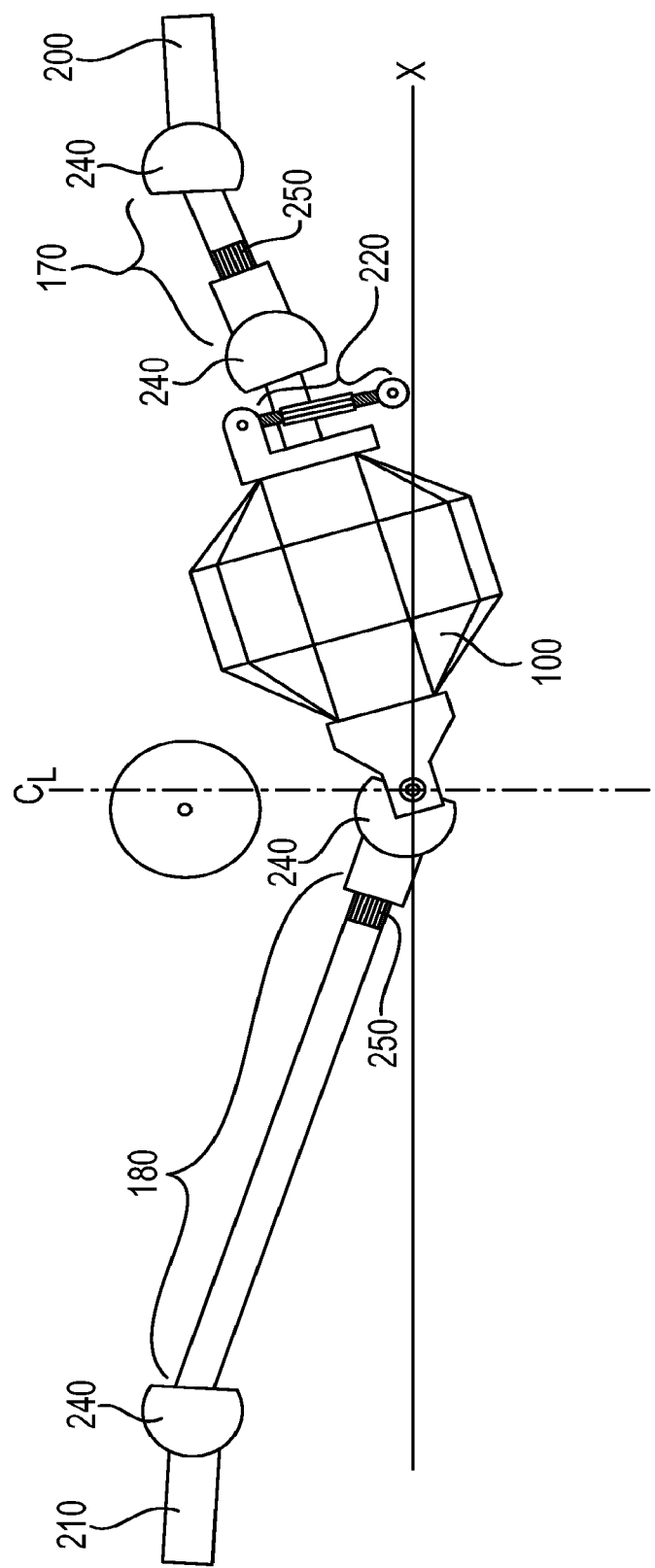
FIG. 5 is a cross sectional view of the differential and axle extending a portion of the width of the vehicle and illustrating various examples of mechanical connections, in accordance with an embodiment of the invention.

With reference to FIG. 1, a vehicle 10 having a vehicle frame 20 is shown with a drivetrain. The drivetrain comprises a transfer case 30 extending from an power plant 40. In this embodiment, the transfer case 30 transfers rotational torque from the power plant 40 to a front drive shaft 50 and to a rear drive shaft 60. The front and rear drive shaft extend a length relative a longitudinal direction of a vehicle length to a respective differential (not shown). The longitudinal direction of the vehicle is illustrated by a horizontal axis X. The front and rear drive shaft move laterally along a vertical axis Y, between full compression and full droop, as illustrated by the change in position of the front drive shaft 50. The front and rear drive shafts are connected to the transfer case using a mechanical connection illustrated by 0 (examples of which are illustrated in FIG. 5). The front and rear drive shafts are also connected to each respective differential using a mechanical connection as illustrated by 0 (examples of which are illustrated in FIG. 5).

In FIG. 1, the front driveshaft length at full compression of the suspension system $DS_{LFC}$ is 41.05 inches. Full compression is when the suspension system is compressed to its fullest extent. The front driveshaft length at full droop of the suspension system $DS_{LFD}$ is 41.62 inches. Full droop is when the suspension system is extended to its fullest extent. The overall drive shaft plunge DSP of the front driveshaft is 0.570 inches. These results are produced while achieving 16 inches of vertical wheel travel using the floating differential suspension system.

Figure 2:
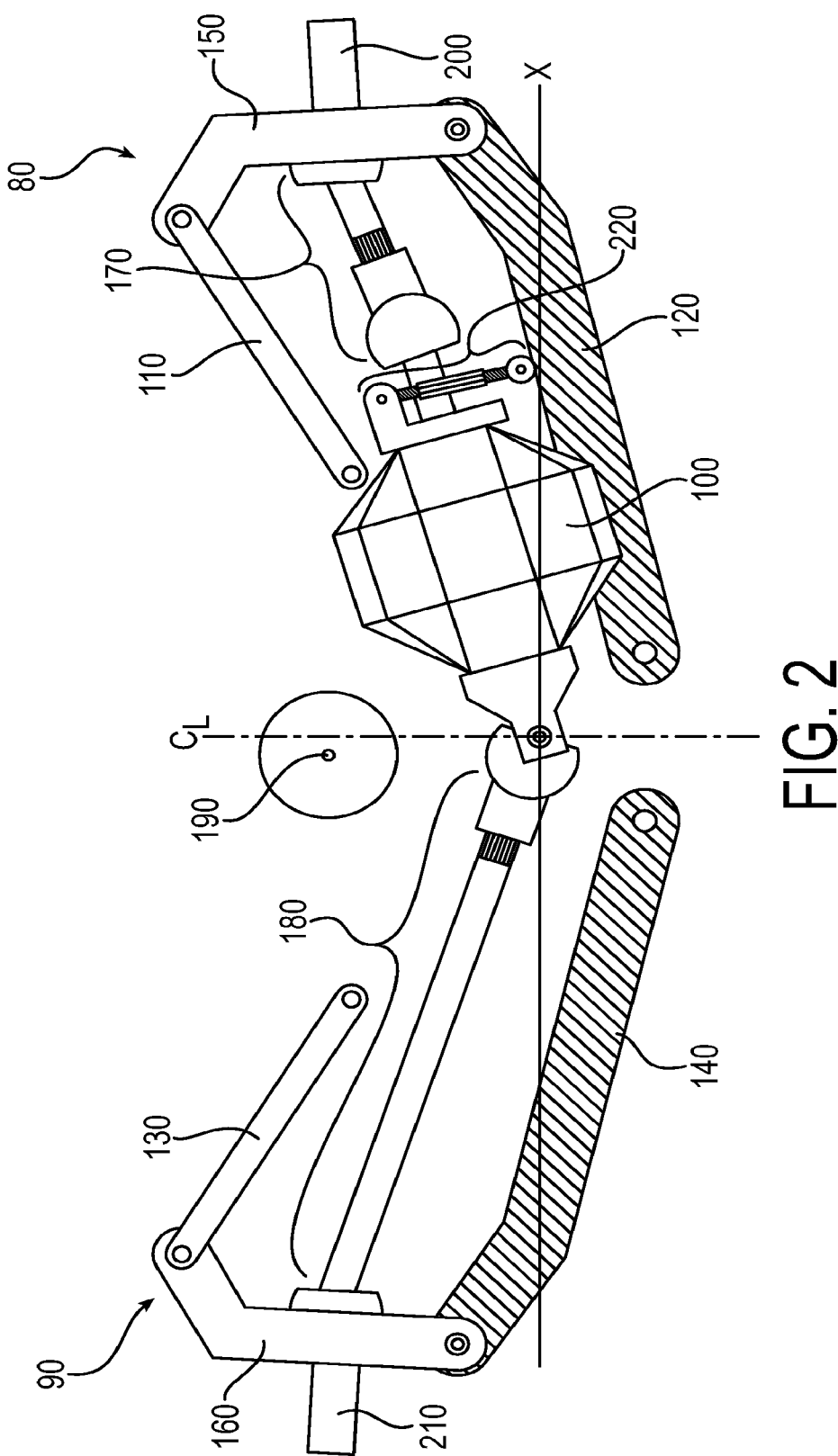
FIG. 2 is a cross sectional view of the floating differential suspension system extending a portion of the width of a vehicle, in accordance with an embodiment of the invention.

FIG. 2 illustrates a cross sectional view of the vehicle drivetrain and suspension system across the width of the vehicle. A vehicle centerline $C_L$, extending in a lateral direction, separates a first suspension system 80 from a second suspension system 90. The first suspension system 80 and the second suspension system 90 positioned to opposite sides of the vehicle centerline $C_L$, on the horizontal axis X. A differential 100 is connected to the first suspension system 80. The vehicle drivetrain (as illustrated by FIG. 1) extends from a power plant crank center 190 to the differential at the first suspension system 80. In some embodiments, the crank center 190 may be the same as the vehicle centerline and, in other embodiments, the crank center 190 may not be the vehicle centerline. In FIG. 2, the differential 100 is connected to a first lower control arm 120 of the first suspension system 80 using a shackle system 220.

In various embodiments, a cradle assembly may be connected to the differential and/or the suspension system. The cradle assembly may be used to secure the floating differential and/or the suspension system to a frame component and/or a frame of a vehicle. In one particular embodiment, the cradle assembly may secure the differential to pivot at the intersection of the vehicle centerline $C_L$ and the horizontal axis X, as illustrated by FIGS. 2-7, in combination with linking the differential to a control arm and/or a-arm and moving the differential with a corresponding range of motion as the control arm and/or a-arm.

In some embodiments, the first suspension system 80 further comprises a first upper a-arm 110. The first upper a-arm 110 is connected to a first spindle 150. Opposite the first upper a-arm 110, the first spindle 150 is additionally connected to the first lower control arm 120. A first axle 170 extends from the differential 100 to a first wheel assembly 200 through the first spindle 150.

A second suspension system 90 is positioned opposite the vehicle centerline $C_L$ in relation to the first suspension system 80. At the second suspension system 90, a second axle 180 is mechanically connected to and extends from the differential 100 to a second spindle 160 and a second wheel assembly 210. Connected to the spindle are a second upper a-arm 130 and a second lower control arm 140.

FIG. 3 illustrates the floating differential suspension system of FIG. 2, further comprising a cradle assembly 300 and at full compression. As shown, the range of vertical motion of the floating differential suspension system is limited by the vehicle frame rail 230 of the vehicle 10 and extends into the frame rail. This may be limited by contacting the frame rail. By creating a void 235 or modifying the control arm and/or the vehicle frame rail, the range of vertical motion of the floating differential suspension system may be increased.

FIG. 4 illustrates the floating differential suspension system of FIG. 2, further comprising a cradle assembly 300 and at full droop. Again, the position of the floating differential suspension system is illustrated in relation to the vehicle frame rail 230 of the vehicle 10, as it extends away from the frame rail. This further illustrates the amount of movement that may occur between a differential rigidly mounted to the frame in contrast to a differential of the floating differential suspension system of the present invention.

FIG. 5 illustrates examples of mechanical connections used in the drivetrain and in the suspension of the floating differential suspension system. In this particular embodiment, a CVD joint 240 connects each axle 170, 180 to each wheel assembly 200, 210 at each spindle 150, 160 (illustrated in FIG. 2). A splined joint 250 and a CVD joint 240 are used to connect each axle 170, 180 to the differential 100. The differential 100 is connected to and moves with the first lower control arm 120 using a shackle system 220 (Heim joint). A universal joint 270 is another example of a mechanical connection and is used to connect the drive shaft 50 to the differential 100. These examples of mechanical connections are not exhaustive.

Figure 6:
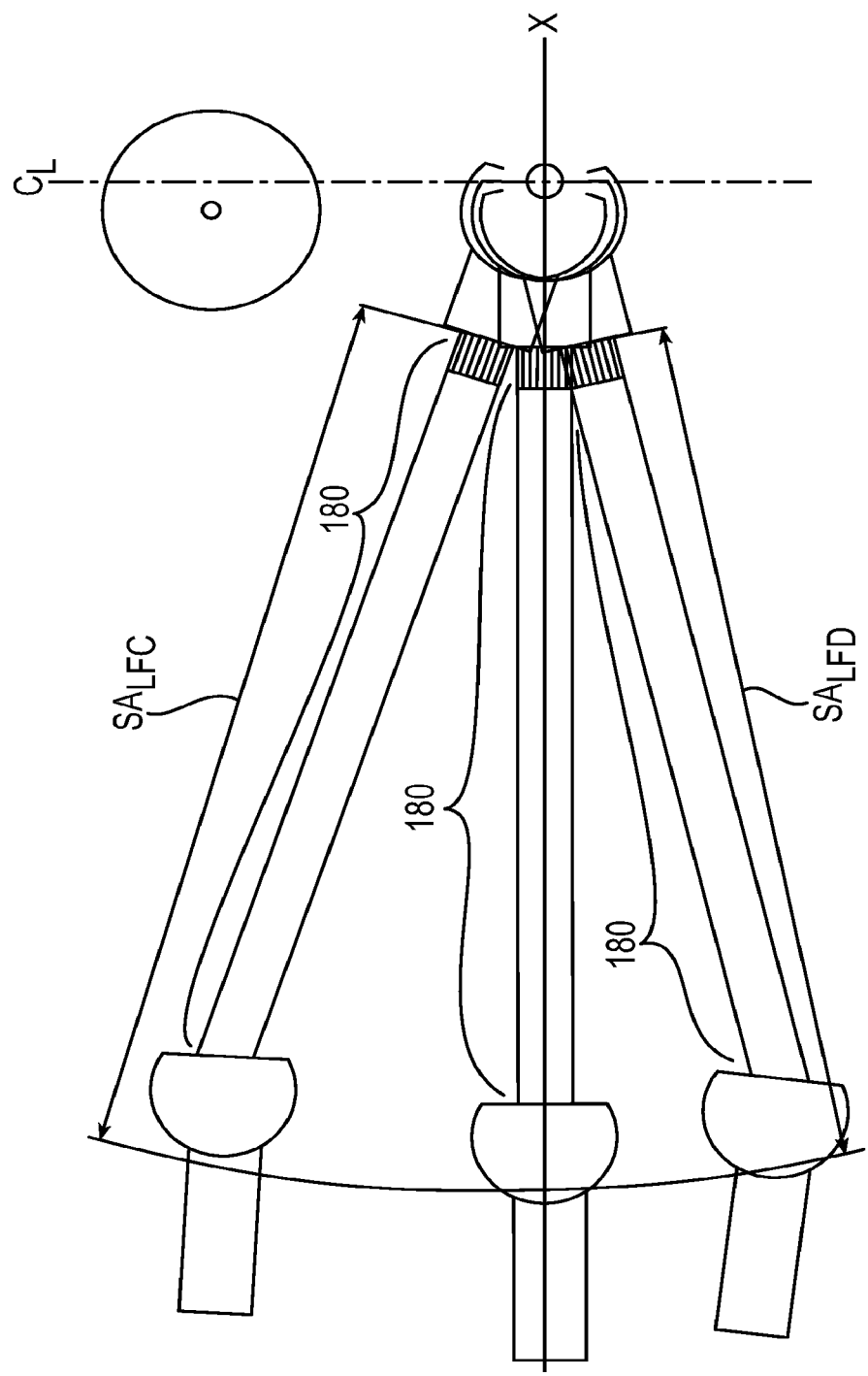
FIG. 6 is a cross sectional view of the second axle of the floating differential suspension system extending a portion of the width of the vehicle and illustrating the plunge at the axle, in accordance with an embodiment of the invention.

With reference to FIG. 6, the amount of second axle plunge $SA_P$ is illustrated at the axle 180 adjacent the second suspension system, using an embodiment of the present invention. Since the differential is connected to and moves with the first lower control arm 120 of the first suspension system 80 a longer axle length is provided across the vehicle centerline $C_L$ and extending to the second suspension system 90 relative the horizontal axis X. The second axle length at full droop $SA_{LFD}$ is 25.4 inches. The second axle length at full compression $SA_{LFC}$ is 26.150 inches. This longer axle length limits the second axle plunge $SA_P$ at the second suspension system 90 to 0.750 inches ($SA_{LFC} - SA_{LFD} = SA_P$) while maintaining 16 inches of vertical suspension travel or wheel travel. Similar to drive shaft plunge as described above, axle plunge includes the distance an axle extends or retracts to or from the joints at each axial end as a result of the angle of the axle and movement of the axle. In other words, total amount of movement in the axial direction of the axle is referred to as plunge. Similar to the first suspension system 80, the second suspension system has 16 inches of vertical suspension travel or wheel travel in this particular embodiment.

Figure 7:
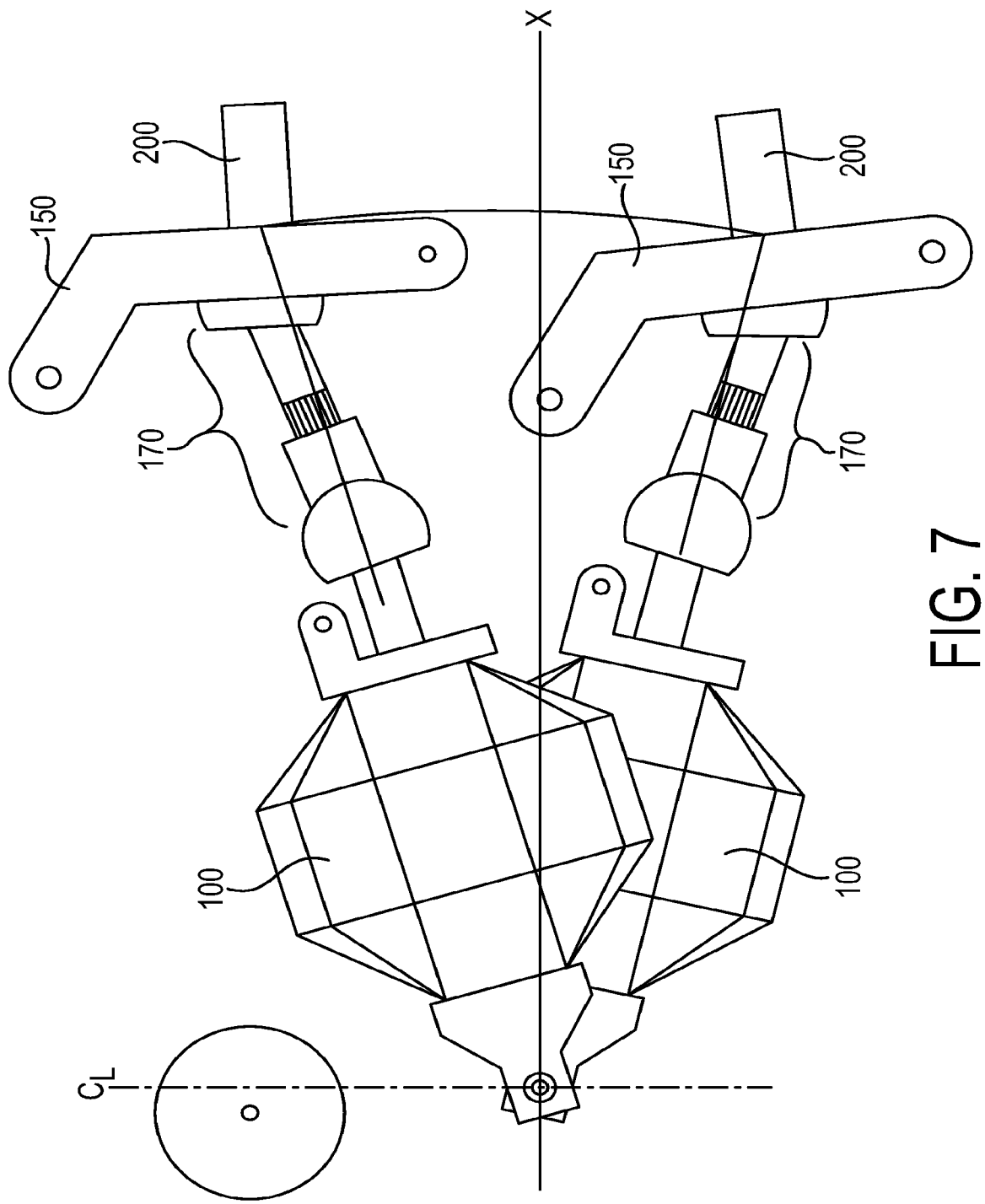
FIG. 7 is a cross sectional view of the first axle of the floating differential suspension system extending a portion of the width of the vehicle and illustrating the plunge at the axle, in accordance with an embodiment of the invention.

With reference to FIG. 7, the amount of first axle plunge $FA_P$ is illustrated at the first suspension system 80 using an embodiment of the present invention. Since the differential 100 is connected to and moves with the first lower control arm 120 (illustrated by FIG. 2) of the first suspension system 80, the first axle plunge $FA_P$ at the differential 100 is limited to 0.695 inches and is calculated in the same manner, respectively, as the second axle plunge (i.e. $SA_{LFC} - SA_{LFD} = SA_P$). Similar to the second suspension system 90, the first suspension system 80 has 16 inches of vertical suspension travel or wheel travel.

Figure 8:
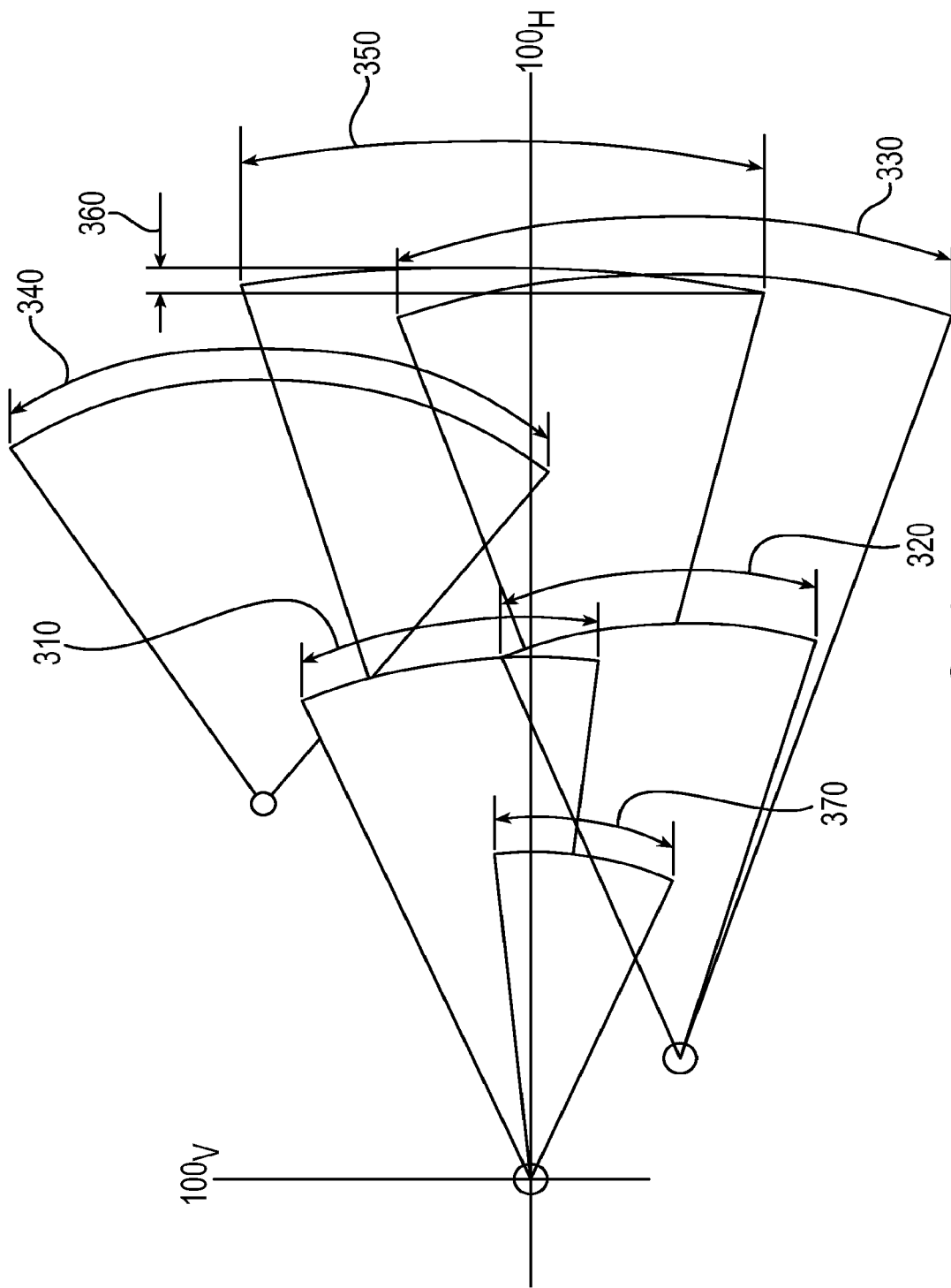
FIG. 8 is a cross sectional view of the first suspension system of the floating differential suspension system extending a portion of the width of the vehicle and illustrating the range of movement of each component of the floating differential suspension system, in accordance with an embodiment of the invention.

FIG. 8 illustrates the relative position of and the amount of travel at each suspension component with reference to a horizontal plane 100H at the differential and a vertical plane 100v at the differential. With reference to the previous FIGs., the horizontal plane 100H at the differential extends in the same direction as the horizontal axis X illustrated in FIGS. 2-7. The vertical plane 100V at the differential has the same direction of travel as the vertical plane as illustrated by the vehicle centerline $C_L$ in FIGS. 2-7. In this embodiment the first suspension system has 16 inches of vertical suspension travel, or wheel travel. A first shackle travel 310 and a second shackle travel 320 is illustrated. The control arm travel 330 and the a-arm travel 340 is also illustrated. Finally, the spindle travel 350, including the amount of axle plunge 360 is also illustrated. A differential yoke travel zone 370 is shown. With 16 inches of wheel travel only 5.6 inches of yoke travel is required, thereby limiting the drive shaft plunge.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the invention.

While this invention has been described with reference to embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any embodiment discussed herein may be combined with one or more features of any one or more embodiments otherwise discussed or contemplated herein unless otherwise stated.

What is claimed is:

1. A drive system for a motor vehicle comprising:
a transfer case adapted to transfer rotational torque from a power plant,
a differential secured to and arranged to move with a control arm, wherein the differential is adapted to be mounted independent of a vehicle frame and the differential is connected to a cradle assembly where the cradle assembly is secured to the vehicle frame, and
the differential is arranged to engage and transfer rotational torque from the transfer case to a wheel assembly.

2. The drive system of claim 1, where the control arm is located to one side of a vehicle centerline of a width of the motor vehicle.

3. The drive system of claim 1, where the differential has a first range of motion and the control arm has a second range of motion independent of the first range of motion.

4. The drive system of claim 1 further comprising:
an axle connected to the differential and the wheel assembly and is arranged to move with the control arm and the differential wherein the axle is connected to the control arm through the differential.

5. The drive system of claim 1 further comprising:
a drive shaft connecting the transfer case to the differential.

6. The drive system of claim 1 further comprising:
one or more drive shaft splines connecting a drive shaft to the transfer case and the one or more drive shaft splines connecting the drive shaft to the differential.

7. The drive system of claim 6, where a plunge at the one or more drive shaft splines is between 0.0 and 1.0 inch.

8. The drive system of claim 1, where the differential is also linked to and arranged to move with an a-arm.

9. The drive system of claim 1, where the differential is secured to the control arm by a shackle system.

10. The drive system of claim 9, where the shackle system securing the differential and the control arm is adjustable.

11. The drive system of claim 1, where the control arm includes a void for receiving a frame rail of the vehicle frame and at least a portion of the control arm extends past a horizontal plane of the frame rail.

12. A drive system for a motor vehicle comprising:
a first suspension system at a first wheel assembly,
a second suspension system at a second wheel assembly, and
a differential secured to and moves with the first suspension system having a corresponding range of motion,
the differential adapted to be mounted independent of a vehicle frame where the differential is connected to a cradle assembly where the cradle assembly is secured to the vehicle frame and the differential is arranged to engage and transfer rotational torque from a power plant or transfer case to the first wheel assembly and to the second wheel assembly through an axle wherein the axle is connected to the first suspension system through the differential.

13. The drive system of claim 12, where a vehicle centerline of a width of a vehicle separates the first suspension system from the second suspension system.

14. The drive system of claim 12, where the differential is secured to and moves with a control arm of the first suspension system.

15. The drive system of claim 12, where the first suspension system and the second suspension system are each connected to the cradle assembly.

16. The drive system of claim 15, where a drive shaft connects the differential to the power plant or transfer case and a plunge at the drive shaft is no more than 0.500 inch for every 5 feet to 7 feet of a length of a longitudinal axis of the drive shaft.

17. The drive system of claim 16, where an angle between the longitudinal axis of the drive shaft and a horizontal plane of the differential is 31 degrees or less.

18. The drive system of claim 16, where an angle between the longitudinal axis of the drive shaft and a horizontal plane of the differential is 32 degrees to 45 degrees.

19. A drive system for a motor vehicle comprising:
a differential pivotally connected to a wheel assembly by an axle,
the wheel assembly connected to a vehicle frame by a suspension system, and
the differential is linked to and moves with the suspension system where the differential is linked to the suspension system independent of the axle and where the differential is mounted independent of the vehicle frame and the differential is connected to a cradle assembly where the cradle assembly is secured to the vehicle frame.

20. A suspension unit for a motor vehicle comprising:
a cradle assembly secured to a vehicle frame where the cradle assembly connects a first suspension system to a second suspension system where the first suspension system and the second suspension system are constructed independent of a vehicle frame, and
a differential that is secured to and moves with the first suspension system where the differential is mounted independent of the vehicle frame and the differential is connected to the cradle assembly where the cradle assembly is secured to the vehicle frame.

* * * * *